(12) United States Patent
Kuriyama et al.

(10) Patent No.: US 12,273,178 B2
(45) Date of Patent: Apr. 8, 2025

(54) COMMUNICATION PATH PRESUMING METHOD AND WIRELESS COMMUNICATION DEVICE

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Toshifumi Miyagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/272,102

(22) PCT Filed: Jan. 26, 2021

(86) PCT No.: PCT/JP2021/002681
§ 371 (c)(1),
(2) Date: Jul. 13, 2023

(87) PCT Pub. No.: WO2022/162739
PCT Pub. Date: Aug. 4, 2022

(65) Prior Publication Data
US 2024/0072876 A1    Feb. 29, 2024

(51) Int. Cl.
*H04B 7/06* (2006.01)
*H04B 7/0413* (2017.01)
*H04B 7/08* (2006.01)

(52) U.S. Cl.
CPC .......... *H04B 7/086* (2013.01); *H04B 7/0413* (2013.01); *H04B 7/0617* (2013.01)

(58) Field of Classification Search
CPC ... H04B 7/04; H04B 7/06; H04B 7/08; H04B 7/10; H04B 7/26; H04B 7/0413;
(Continued)

(56) References Cited

U.S. PATENT DOCUMENTS

2008/0117997 A1* 5/2008 Maltsev ............. H04L 25/0248
375/267
2024/0305338 A1* 9/2024 Kuriyama ............ H04B 7/0634

OTHER PUBLICATIONS

Kuriyama et al., "Wideband Single-Carrier MIMO System with FIR Transmit Beamforming and Bi-directional Rx Equalization", Proceedings of IEICE General Conference 2019, The Institute of Electronics, Information and Communication Engineers, B-5-105, Mar. 2019, pp. 371 (2 pages including English Translation).

* cited by examiner

*Primary Examiner* — Shawkat M Ali
(74) *Attorney, Agent, or Firm* — XSENSUS LLP (57) ABSTRACT

An adjoint matrix $adjH(z, t)$ of a transfer function matrix $H(z, t)$ established between a transmission station and a reception station is defined as a transmission weight $WT(z)$. A training signal multiplied by the transmission weight $WT(z)$ is transmitted from transmission antennas toward a reception station. M sequence portions S included in the received training signals #1 and #2 are connected in series to generate a virtual training signal block. A communication path response $R(m)$ implemented by using the transmission weight $WT(z)$ is calculated by calculating a correlation between both an M sequence portion S and a comparison sequence portion at each position while sliding the comparison sequence portion with respect to the virtual training signal block. Based on the communication path response $R(m)$, a reception equalization weight $WR(z)$ corresponding to an inverse response $det\{H(z, t)\}-1$ of a determinant $det\{H(z, t)\}$ of the transfer function matrix $H(z, t)$ is calculated.

11 Claims, 8 Drawing Sheets

(58) Field of Classification Search
CPC .. H04B 7/0617; H04B 7/0634; H04B 7/0686; H04B 17/14; H04J 3/06; H04J 11/00; H04L 1/02; H04L 5/00
USPC ........ 370/208, 329, 341, 491; 375/219, 260, 375/267, 295, 316
See application file for complete search history.

COMMUNICATION PATH PRESUMING METHOD AND WIRELESS COMMUNICATION DEVICE

CROSS-REFERENCE TO RELATED APPLICATION

The present application is based on PCT filing PCT/JP2021/002681, filed Jan. 26, 2021, the entire contents of which are incorporated herein by reference.

TECHNICAL FIELD

The present disclosure provides a technology for extending a maximum delay time (hereinafter referred to as a delay wavelength) of presumable delayed waves without extending the actual training signal section by performing communication path presumption using a virtually generated training signal section in a single-carrier (SC) multiple input multiple output (MIMO) system using finite impulse response (FIR) transmission beamforming.

BACKGROUND ART

The following NPL 1 discloses a scheme of presuming a communication path in an SC-MIMO system using FIR transmission beamforming, more specifically, a scheme of presuming a communication path response using a channel impulse response (CIR) transfer function matrix H(z) when the number of transmission and reception antennas is N and a CIR channel impulse response length is L.

When the CIR transfer function matrix H(z) is regular, the inverse matrix $H(z)^{-1}$ is obtained by multiplying an inverse response $\det\{H(z)\}^{-1}$ of a determinant $\det\{H(z)\}$ by an adjoint matrix $\adj\{H(z)\}$. NPL 1 discloses a scheme of separating an inverse matrix $H(Z)^{-1}$ of H(z) into the adjoint matrix $\adj\{H(z)\}$ and the inverse response $\det\{H(z)\}^{-1}$, using the former as a transmission weight $W_T(z)$, and the latter as a reception equalization weight $W_R(z)$.

When the adjoint matrix $\adj\{H(z)\}$ is used as the transmission weight $W_T(z)$, $H(z)W_T(z)$ becomes a diagonal matrix that has $\det\{H(z)\}$ as a diagonal element. Then, when $H(z)W_T(z)$ is diagonalized, an environment in which N single input single output streams are formed between N transmission antennas and N reception antennas seems to be established, and thus interference between the streams is inhibited.

NPL 1 further discloses inhibition of inter-symbol interference since H(z) becomes a unit matrix when a received signal is multiplied by $\det\{H(z)\}^{-1}$ which is a reception equalization weight $W_R(z)$. Thus, according to the scheme described in NPL 1, a MIMO system in which it is not necessary to separate a received signal can be constructed.

CITATION LIST

Non Patent Literature

[NPL 1] Wide-band Single-Carrier MIMO System Using FIR-type Transmit Beamforming and Bi-Directional Receive Equalization, Keita Kuriyama, Hayato Fukuzono, Masafumi Yoshioka, Tsutomu Tatsuta, 2019, Institute of Electronics, Information and Communication Engineers, B-5-105, March 2019

SUMMARY OF INVENTION

Technical Problem

Communication path estimation for calculating a reception equalization weight $W_R(z)$ is preferably performed using a transmission beam formed by multiplying by the transmission weight $W_T(z)$. Then, since a virtual communication path after the transmission beamforming is expressed by convolution of a communication path response between antennas in association with the multiplication by the transmission weight $W_T(z)$, the virtual communication path becomes virtually longer than an actual delay wavelength.

Incidentally, when a MIMO system is constructed, a delay wavelength to be generated is assumed, and a communication path is presumed using a training signal section in which the delay wavelength can be presumed. In this case, the delay wavelength which can be presumed is necessarily fixed. On the other hand, a delay wavelength that is actually generated may exceed the assumption because the environment between a transmission side and a reception side is different. When the delay wavelength of the virtual communication path exceeds the assumption, the virtual communication path for calculating the reception equalization weight $W_R(z)$, particularly, may exceed the delay wavelength which can be presumed.

In this case, the reception equalization weight $W_R(z)$ cannot be correctly calculated, and thus a bit error rate becomes large. When the training signal section is sufficiently extended to presume a communication path in preparation for such an unexpected situation, a problem related to deterioration in accuracy of the reception equalization weight $W_R(z)$ can be avoided, but a problem of deterioration in a transmission capacity due to this contradiction occurs.

The present disclosure has been made in view of the foregoing problems and a first objective is to provide a communication path presuming method capable of extending a delay wavelength which can be presumed without extending an actual training signal section.

A second object of the present disclosure is to provide a wireless communication device that functions as a transmission station for extending a delay wavelength which can be presumed without extending an actual training signal section.

A third object of the present disclosure is to provide a wireless communication device that functions as a reception station for extending a delay wavelength which can be presumed without extending an actual training signal section.

Solution to Solving the Problem

To achieve the foregoing objectives, a first aspect of the present invention is a communication path presuming method of presuming a communication path between a transmission station and a reception station in a MIMO system including the transmission station which has a plurality of transmission antennas and the reception station which has a plurality of reception antennas.

The method preferably includes: a transmission weight calculation step of calculating an adjoint matrix $\adj H(z, t)$ of a transfer function matrix $H(z, t)$ established between the transmission station and the reception station as a transmission weight $W_T(z)$;

a step of transmitting, from at least two transmission antennas, a training signal which is beamformed by multiplying a transmission signal by the transmission weight $W_T(z)$ along with the transfer function matrix $H(z, t)$ and includes a known symbol group as a correlation sequence portion from the transmission station to the reception station;

a step of generating a virtual training signal block by connecting in series the correlation sequence portions included in each of at least the two training signals received by at least the two reception antennas;

a step of calculating a communication path response $R(m)$ virtually implemented between the transmission station and the reception station using the transmission weight $W_T(z)$ by calculating a correlation between the correlation sequence portion and a comparison sequence portion formed from the same symbol group as the correlation sequence portion at each position while sliding the comparison sequence portion with respect to the virtual training signal block; and a step of calculating a reception equalization weight $W_R(z)$ corresponding to an inverse response $\det\{H(z, t)\}^{-1}$ of a determinant $\det\{H(z, t)\}$ of the transfer function matrix $H(z, t)$ based on the communication path response $R(m)$.

A second aspect of the present invention is a wireless communication device that has a plurality of transmission antennas and forms a MIMO system along with a reception station that has a plurality of reception antennas.

The wireless communication device includes a transmission beamforming unit including a processor unit and a memory device.

The transmission beamforming unit preferably performs:

processing for acquiring an adjoint matrix $\text{adj}H(z, t)$ of a transfer function matrix $H(z, t)$ established between the wireless communication device and the reception station as a transmission weight $W_T(z)$;

processing for transmitting, from at least two transmission antennas, a training signal that is beamformed by multiplying a transmission signal by the transmission weight $W_T(z)$ along with the transfer function matrix $H(z, t)$ and includes a known symbol group as a correlation sequence portion; and processing for transmitting a data signal beamformed by multiplying by the transmission weight $W_T(z)$ to the reception station after the reception station calculates a reception equalization weight $W_R(z)$ corresponding to an inverse response $\det\{H(z, t)\}^{-1}$ of a determinant $\det\{H(z, t)\}$ of the transfer function matrix $H(z, t)$.

A third aspect of the present invention is a wireless communication device that has a plurality of reception antennas and forms a MIMO system along with a transmission station that has a plurality of transmission antennas.

The wireless communication device includes an equalization unit including a processor unit and a memory device.

The equalization unit preferably performs:

processing for receiving, from at least two reception antennas, training signals which are transmitted from at least the two transmission antennas in a state in which the training signals are beamformed using a transmission weight $W_T(z)$ for eliminating interference between streams and include a known symbol group as correlation sequence portions;

processing for generating a virtual training signal block by connecting in series the correlation sequence portions included in at least the two training signals;

processing for calculating a communication path response $R(m)$ virtually implemented between the transmission station and the wireless communication device using the transmission weight $W_T(z)$ by calculating a correlation between the correlation sequence portion and a comparison sequence portion formed from the same symbol group as the correlation sequence portion at each position while sliding the comparison sequence portion with respect to the virtual training signal block; and processing for calculating a reception equalization weight $W_R(z)$ for demodulating a transmission signal from a reception signal based on the communication path response $R(m)$.

Advantageous Effects of Disclosure

According to the first to third aspects of the present disclosure, the correlation sequence portions included in at least two training signals are connected in series, and a sufficiently long virtual training signal block can be formed. According to the virtual training signal block, a sufficient slide range corresponding to a sufficiently long delay can be secured. Therefore, according to the aspects, the delay wavelength which can be presumed without extending the actual training signal section can be extended.

DESCRIPTION OF EMBODIMENTS

First Embodiment

Configuration of Embodiment 1

Figure 1:
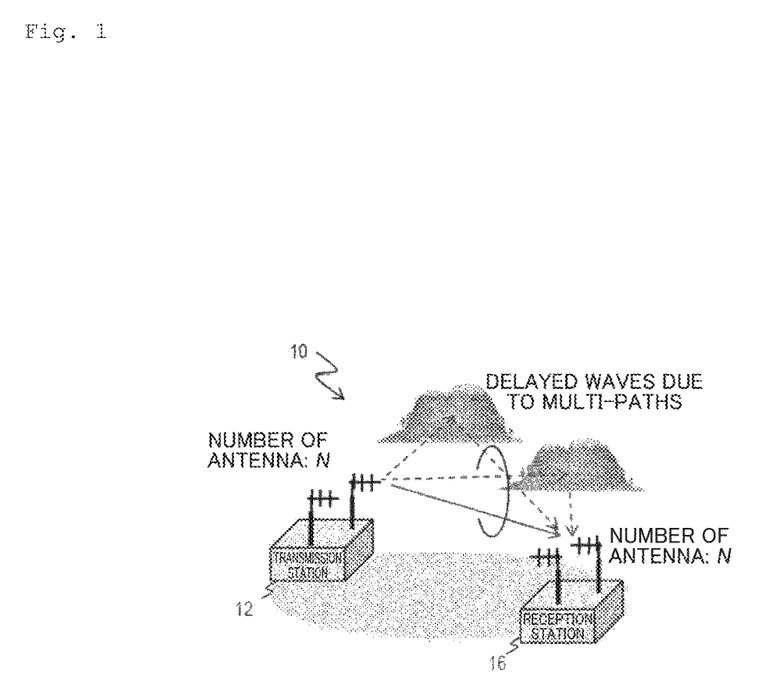
FIG. 1 is a diagram illustrating a model of a system 1 according to a first embodiment of the present disclosure.

FIG. 1 is a diagram illustrating a model of a system according to a first embodiment of the present disclosure. As illustrated in FIG. 1, a communication system 10 according to the embodiment includes a transmission station 12 and a reception station 16. The transmission station 12 and the reception station 16 are located apart from each other and each include N antennas.

The transmission station 12 and the reception station 16 are included in a MIMO system, and can perform wireless communication using the N antennas that each includes. Multi-paths illustrated in FIG. 1 are formed between the antennas included in the transmission station 12 and the antennas included in the reception station 16. In FIG. 1, a solid line arrow indicates a path of direct waves, and a broken line arrow indicates a path of reflected waves.

Figure 2:
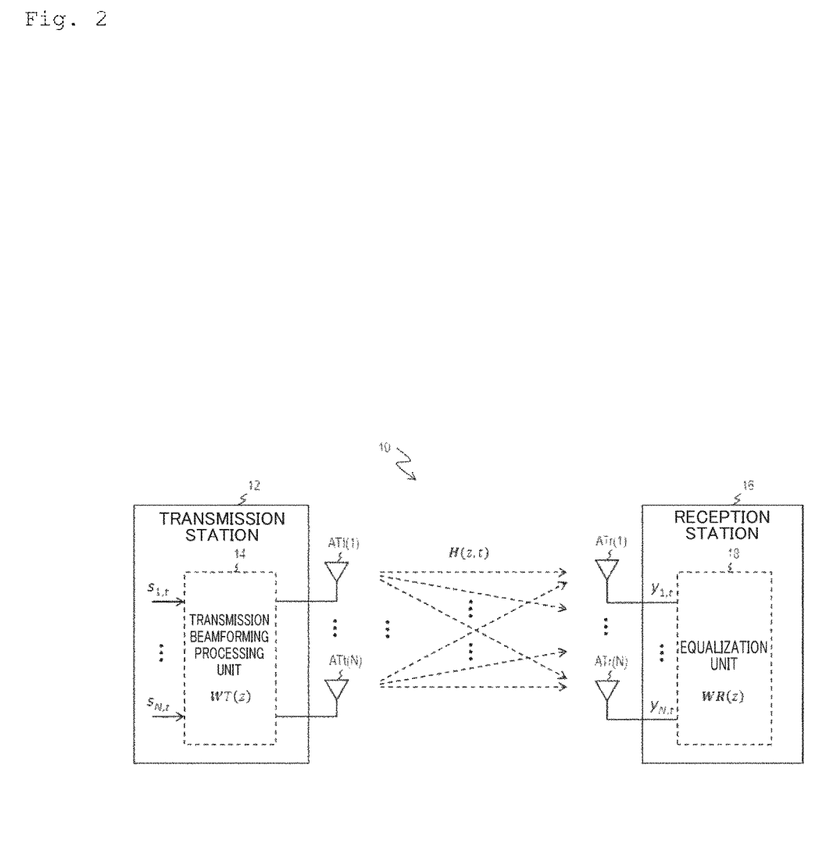
FIG. 2 is a functional block diagram illustrating the system according to the first embodiment of the present disclosure.

FIG. 2 is a block diagram illustrating the communication system 10 illustrated in FIG. 1. The transmission station 12 has hardware including a general-purpose computer system. The hardware includes a processor unit such as a CPU and various memory devices. The transmission station 12 implements a function of the transmission station 12 by advancing processing according to a program stored in a memory device by the processor unit. The same applies to the reception station 16.

As illustrated in FIG. 2, the transmission station 12 includes a transmission beamforming unit 14. In the transmission beamforming unit 14, N transmission signals $s_{1,t}$ to $s_{N,t}$ are given at a time t. The transmission signals $s_{1,t}$ to $s_{N,t}$ are signals corresponding to the N antennas ATt(1) to ATt(N), respectively. The transmission beamforming unit 14 can generate transmission beams by multiplying the transmission signals $s_{1,t}$ to $s_{N,t}$ by a transmission weight $W_T(z)$.

The reception station 16 includes an equalization unit 18. The equalization unit 18 is provided with reception signals $y_{1,t}$ to $y_{N,t}$ arriving at antennas ATr(1) to ATr(N) at a time t. The equalization unit 18 performs equalization processing for demodulating the transmission signals by multiplying the reception signals $y_{1,t}$ to $y_{N,t}$ by a reception equalization weight $W_R(z)$.

Processing Performed in First Embodiment

Figure 3:
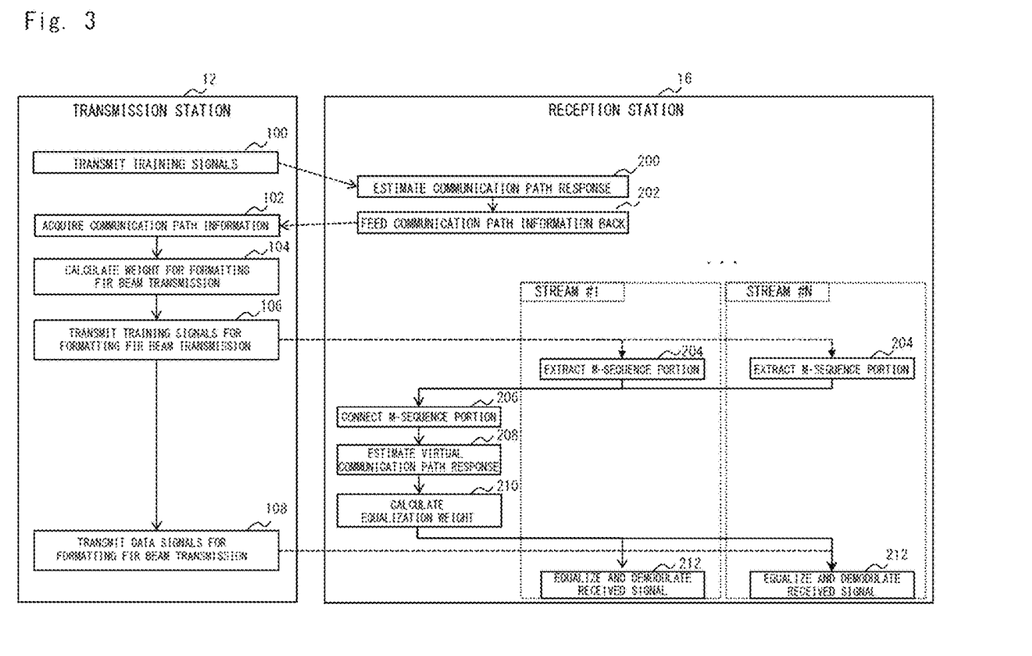
FIG. 3 is a flowchart illustrating a flow of processing performed by the system according to the first embodiment of the present disclosure.

FIG. 3 is a flowchart illustrating an example of a processing procedure executed by the transmission station 12 and the reception station 16 according to the embodiment.

As illustrated in FIG. 3, in the present embodiment, a training signal is first transmitted from the transmission station 12 to the reception station 16 (step 100). The training signal transmitted in step 100 is a signal necessary to calculate the transmission weight $W_T(z)$.

When interference occurs between streams in transmission and reception of training signals, a communication path response between each of the transmission antennas ATt(1) to ATt(N) and each of the reception antennas ATr(1) to ATr(N) cannot be appropriately ascertained. Therefore, the training signals are sequentially transmitted from the transmission antennas ATt(1) to ATt(N) to the reception station 16 here.

In the reception station 16 which has received the training signals by the reception antennas ATr(1) to ATr(N), a communication path response is presumed based on these signals (step 200).

Figure 4:
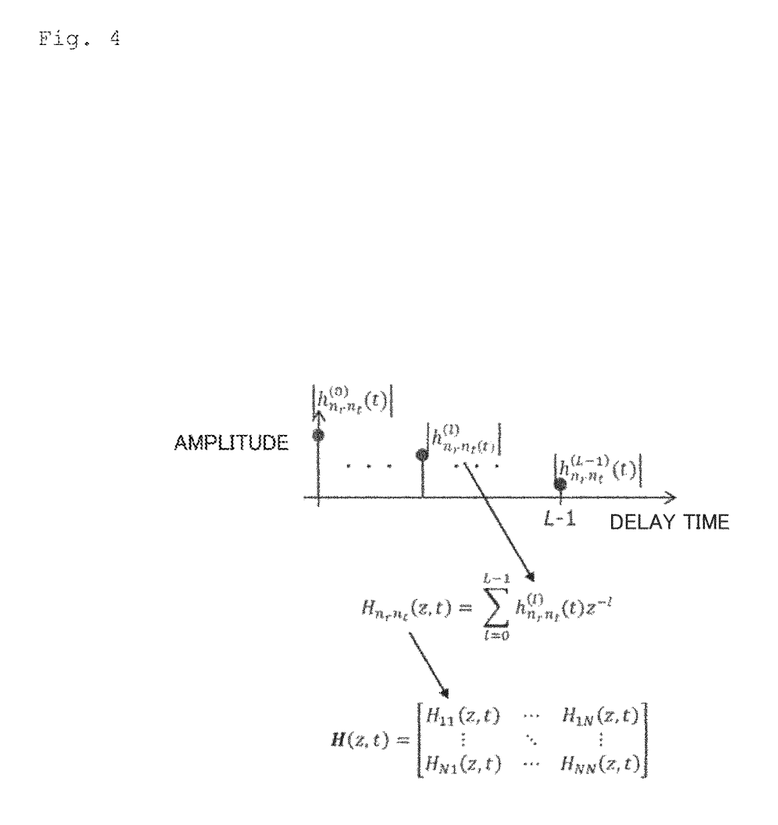
FIG. 4 is a diagram illustrating a transfer function matrix $H(z, t)$ established between a transmission station and a reception station according to the first embodiment of the present disclosure.

FIG. 4 is a diagram illustrating a principle by which the reception station 16 presumes a communication path response based on the training signals transmitted from the transmission station 12.

The upper part of FIG. 4 illustrates a gain (amplitude) of the received signals obtained by an $n_r$-th reception antenna ATr($n_r$) due to the training signal transmitted from the nt-th transmission antenna ATt(nt) at a time t. In the drawing, for example, (0) included in $|h^{(0)}{n_r n_t}(t)|$ and (L−1) included in $|h^{(L-1)}{n_r n_t}(t)|$ (represent a degree of delay. As described with reference to FIG. 1, the signal transmitted from the transmission station 12 arrives at the reception station 16 via a multi-path. At this time, the signal passing along a path of reflected waves is delayed and attenuated to arrive compared with a signal passing along a path of direct waves. As a result, the reception antenna ATt($n_r$) generally obtains an input as illustrated in the upper part of FIG. 4.

When the input illustrated in the upper part of FIG. 4 is obtained by the reception antenna ATr($n_r$) with respect to the training signal transmitted from the transmission antenna ATt($n_t$), the communication path response between these antennas can be expressed as in the following expression, as illustrated in the middle part of FIG. 4.

$$H_{n_r n_t}(z, t) = \sum_{l=0}^{L-1} h_{n_r n_t}^{(l)}(t) z^{-l} \qquad \text{[Math. 1]}$$

Through the processing of steps 100 and 200 described above, the foregoing $H_{n_r n_t}(z, t)$ can be obtained for all combinations of the N transmission antennas ATt(1) to ATt(N) and the N reception antennas ATr(1) to ATr(N). The communication path response between the N transmission and reception antennas can be expressed as in the following expression, as illustrated in the lower part of FIG. 4, using the results.

$$H(z, t) = \begin{bmatrix} H_{11}(z, t) & \cdots & H_{1N}(z, t) \\ \vdots & \ddots & \vdots \\ H_{N1}(z, t) & \cdots & H_{NN}(z, t) \end{bmatrix} \qquad \text{[Math. 2]}$$

Figure 5:
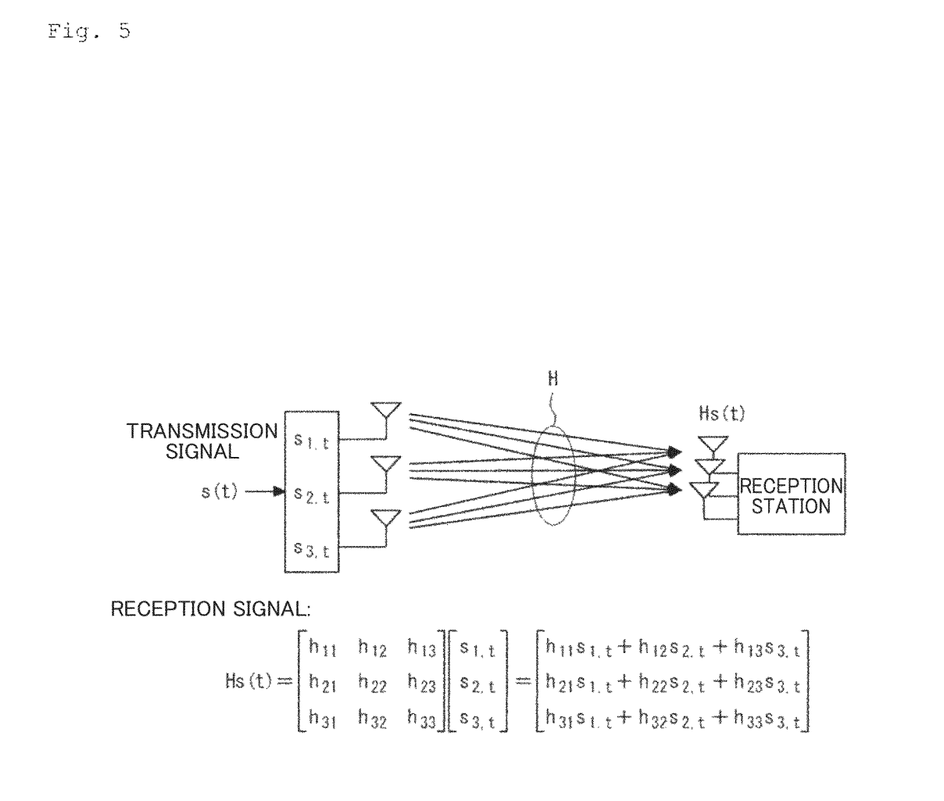
FIG. 5 is a diagram illustrating a relation between a transmission signal $s(t)$, a transfer function matrix $H$, and a reception signal $Hs(t)$.

FIG. 5 illustrates a state in which each of signals $s_{1,t}$, $s_{2,t}$, $s_{3,t}$ is transmitted from the three transmission antennas by 3×3 MIMO. In this case, the received signal Hs(t) obtained by the three reception antennas can be indicated, as illustrated in the lower part of FIG. 5, using each element of the transfer function matrix H(z, t) indicating the presumed communication path response.

In this case, an individual reception signal in which three transmission signals $s_{1,t}$, $s_{2,t}$, and $s_{3,t}$ are mixed arrive at the reception antennas. Therefore, in order to reproduce the transmission signals, it is necessary to perform separation processing for the reception signals.

On the other hand, in the present embodiment, in order to eliminate the need for the separation processing, the transmission signal is multiplied by the appropriate transmission weight $W_T(z)$ along with the transfer function matrix H(z, t). The following shows a result of multiplication of the transfer function matrix H(z, t) and the adjoint matrix adj{H(z, t)}. Here, in this case, for simplicity, each matrix is a 2×2 matrix.

$$H(z, t) \text{adj}\{H(z, t)\} = \begin{bmatrix} H_{11}(z, t) & H_{12}(z, t) \\ H_{21}(z, t) & H_{22}(z, t) \end{bmatrix} \qquad \text{[Math. 3]}$$
$$\begin{bmatrix} H_{22}(z, t) & -H_{12}(z, t) \\ -H_{21}(z, t) & H_{11}(z, t) \end{bmatrix}$$
$$= \begin{bmatrix} \det\{H(z, t)\} & 0 \\ 0 & \det\{H(z, t)\} \end{bmatrix}$$

In the expression, det{H(z, t)} is a determinant of H(z, t) and is expressed specifically in the following expression.

$$\det\{H(z,t)\} = H_{11}(z,t)H_{22}(z,t)H_{12}(z,t)H_{21}(z,t)$$

When the transfer function matrix H(z, t) is multiplied by the adjoint matrix adj{H(z, t)} as shown in the foregoing operation expression, The result is a diagonal matrix that has det{H(z, T)} as a diagonal element. When the diagonal matrix is multiplied by the transmission signal, a signal arriving at each of the reception antennas becomes a signal including only a single transmission signal.

The following calculation expressions indicate the reception signals $y_{1,t}$ to $y_{n,t}$ arriving at N reception antennas ATr(1) to Atr(N) when the transmission beamforming unit 14 of the transmission station 12 uses the adjoint matrix adj{H(z, t)} of the transfer function matrix H(z, t) as the transmission weight $W_T(z)$.

$$\begin{cases} y_{1,t} = \det\{H(z,t)\}s_{1,t} \\ \vdots \\ y_{N,t} = \det\{H(z,t)\}s_{N,t} \end{cases}$$ [Math. 4]

The calculation expression indicates that only a single transmission signal is included in each of the reception signals $y_{1,t}$ to $y_{n,t}$ and that all streams indicate the same communication path response expressed as det{H(z, t)}. In other words, N streams that each indicate the characteristics of a single input and a single output and can be indicated by the same communication path response are formed between the transmission station 12 and the reception station 16. In this case, processing for setting an inverse response det{H(z, t)}$^{-1}$ of the determinant det{H(z, t)} as the reception equalization weight $W_R(z)$ is necessary subsequently, but separation processing for the reception signal can be unnecessary.

Referring back to the flowchart illustrated in FIG. 3, in this embodiment, in order to realize the foregoing function, the reception station 16 feeds the communication path information back to the transmission station 12 after step 200 ends (step 202). Specifically, information regarding the transfer function matrix H(z, t) presumed in step 200 is fed back.

The transmission station 12 receives the feedback and acquires the information regarding the transfer function matrix H(z, t) as communication path information (step 102).

Subsequently, the transmission station 12 calculates the adjoint matrix adj{H(z, t)} of the transfer function matrix H(z, t) as the transmission weight $W_T(z)$ of the FIR beamforming (step 104).

Next, the transmission station 12 transmits the FIR beam formed by using the transmission weight $W_T(z)$ as a training signal for calculating the reception equalization weight $W_R(z)$ (step 106). In the present embodiment, as described above, the inverse response det{H(z, t)}$^{-1}$ of the determinant det{H(z, t)} of H(z, t) indicating the communication path response is used as the reception equalization weight $W_R(z)$. Accordingly, the reception equalization weight $W_R(z)$ can be obtained from H(z, t) acquired in the process of step 200 by calculation. However, an environment between the transmission station 12 and the reception station 16 changes over time, for example, by movement of a moving body located between the transmission station 12 and the reception station 16. In the present embodiment, in order to avoid deterioration in accuracy due to such a change over time, communication path presumption is performed again in order to calculate the reception equalization weight $W_R(z)$.

The FIR beam formed by multiplying the transmission weight $W_T(z)$ can be handled as a beam in which no interference occurs between the streams. Therefore, in step 106, it is possible to simultaneously transmit a maximum of N training signals from the N transmission antennas ATt(1) to ATt(N). In this embodiment, at least two training signals are assumed to be simultaneously transmitted in step 106.

Feature of Embodiment 1

Figure 6:
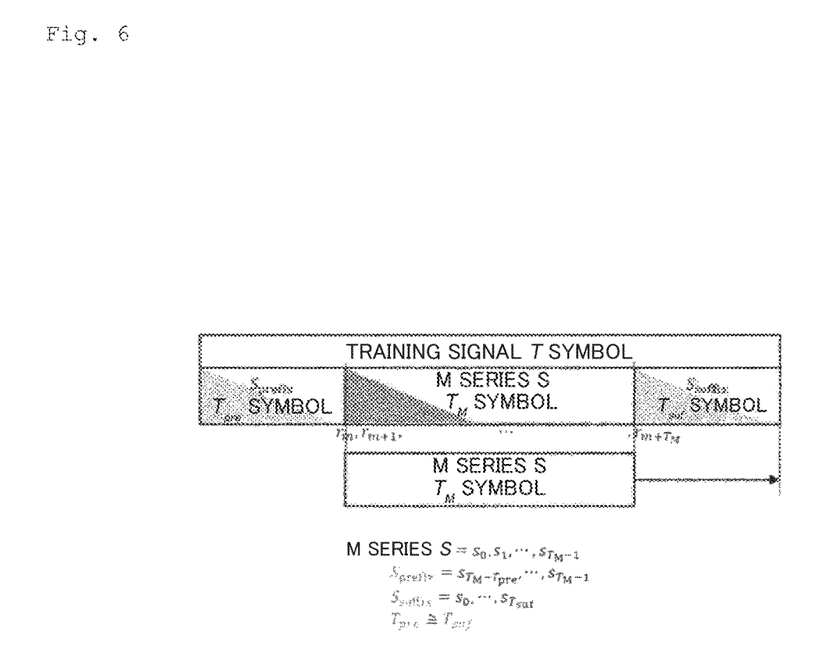
FIG. 6 is a diagram illustrating an example of a scheme of calculating a communication path response $R(m)$ for equalization weight calculation.

FIG. 6 is a diagram illustrating a basic scheme of calculating the communication path response R(m) for calculating the reception equalization weight $W_R(z)$. Here, a principle of calculating the communication path response R(m) for calculating the reception equalization weight $W_R(z)$ by a slide correlation scheme will be described.

FIG. 6 illustrates an example of a training signal transmitted from one transmission antenna when the slide correlation scheme is used. The training signal illustrated in FIG. 6 includes a prefix portion Sprefix, an M sequence portion S, and a suffix portion Ssuffix.

The training signal includes a T symbol (for example, 60 symbols). The M sequence portion S is a correlation sequence of a $T_M$ symbol (for example, 31 symbols) and has symbols of $s_0$ to $s_{TM-1}$ (for example, $s_0$ to $S_{30}$). The prefix portion Sprefix includes a Tpre symbol (for example, 15 symbols, $s_{16}$ to $S_{30}$) in the latter half of the M sequence portion S. The suffix portion Ssuffix includes a Tsuf symbol (for example, 14 symbols, $s_0$ to $S_{13}$) of the first half of the M sequence portion S.

In the example illustrated in FIG. 6, a symbol name of $r_m$ (for example, r0) is attached to the head of the M sequence portion S of the training signal, and a symbol name of $r_{m+TM}$ (for example, r31) is attached to the head of the suffix portion Ssuffix. In the lower part of FIG. 6, an M sequence portion S for comparison is illustrated so that the position of the head of the M sequence portion S of the training signal is aligned with that of the M sequence portion S for comparison. The M sequence portion S in the lower part of FIG. 6 also includes the TM symbol of $s_0$ to $s_{TM-1}$ like the M sequence portion S of the training signal, In the training signal in the upper part of FIG. 6, a right-down triangular figure is written in each of the prefix portion Sprefix, the M sequence portion S, and the suffix portion Ssuffix. Since the training signals illustrated in FIG. 6 arrive at the reception station 16 along the multi-paths, the training signals arrive at the reception station 16 with delay and attenuation as in the signal illustrated in the upper part of FIG. 4. A triangle written in the prefix portion Sprefix indicates delay and attenuation appearing in a head symbol of the prefix portion Sprefix. The same applies to a triangle written in the M sequence portion S and the suffix portion Ssuffix. All the symbols included in the training signal in the upper part of FIG. 6 arrive at the reception station 16 with similar delay and attenuation.

A gain of each symbol included in the training signal is the largest when the delay is zero. Therefore, a correlation between the M sequence portion S of the upper part and the M sequence portion S of the lower part is the highest when the head of the M sequence portion S of the lower part matches the head of the M sequence portion of the upper part, that is, when there is a positional relation illustrated in FIG. 6. When the M sequence portion S of the lower part is slid backward by one symbol, the M sequence portion S is compared with the M sequence portion S attenuated by one symbol, and thus the correlation is lowered by that amount.

Thereafter, similarly, as the M sequence portion S of the lower part slides backward, the correlation between the two portions decreases.

In the slide correlation scheme, a state in which the head of the M sequence portion S of the lower part matches the head of the M sequence portion S of the upper part is set as a starting point, the correlation between the two portions is calculated while sliding the M sequence portion S of the lower part until the end of the M sequence portion S of the lower part matches the end of the suffix portion Ssuffix of the upper part. The correlation at each position in the sliding process is calculated by the following equation.

$$R(m) = \frac{1}{T_M} \sum_{p=0}^{T_{M-1}} s_p r^*_{p+m}$$ [Math. 5]

r: Reception signal series

*: Complex conjugate

When the correlation is calculated by sliding the M sequence portion S of the lower part, all symbols $s_0$ to $s_{TM-1}$ of the M sequence portion S are preferably arranged in an area overlapping the M sequence portion S of the lower part in the training signal of the upper part. Therefore, in the training signal illustrated in FIG. 6, the suffix portion Ssuffix including the symbols of the first half of the M sequence portion S continues behind the M sequence portion S.

On the other hand, the vicinity of the head of the training signal, that is, the prefix portion Sprefix may be affected by a delay component of the previous slot of that signal. Therefore, in the present embodiment, the prefix portion Sprefix is excluded from comparison targets for calculating the correlation, and the communication path response R(m) is presumed with symbols after the head of the M sequence portion S. However, it is necessary to include the prefix portion Sprefix in the training signal in order to generate a guard region between the present slot and the previous slot.

Figure 7:
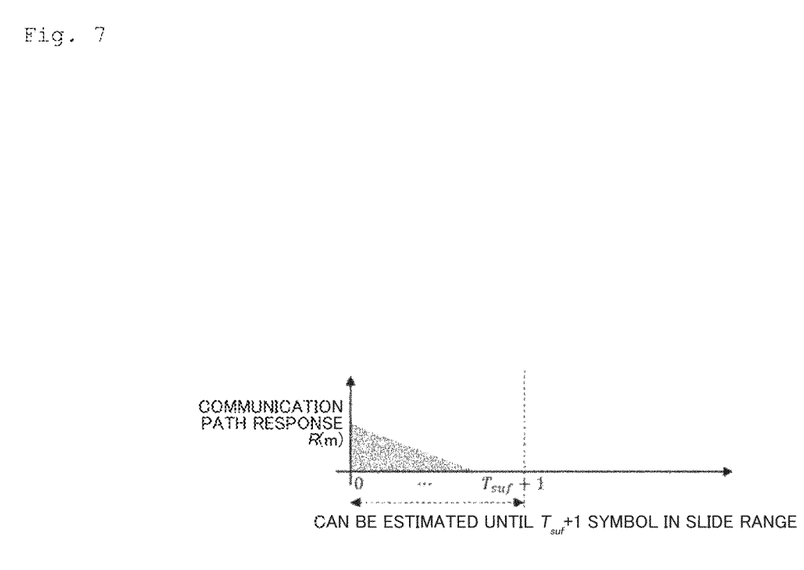
FIG. 7 is a diagram illustrating an example of the communication path response $R(m)$ obtained by a slide correlation scheme illustrated in FIG. 6.

FIG. 7 illustrates a communication path response obtained by plotting a result of the correlation R(m) calculated by the foregoing scheme in the relation with a slide amount. The communication path response illustrated in FIG. 7 correctly indicates a state of the multi-paths between one transmission antenna which transmits a training signal and one reception antenna which receives the training signal, as in the communication path response $Hn_rn_t(z, t)$ indicated by [Math. 1].

In an environment where a transmission beam obtained by multiplying the transmission weight $W_T(z)$ is transmitted, the communication path responses of all streams become the same, as described above. In this case, the transfer function matrix H(z, t) (referred to as H(z, t) for convenience) virtually established between the transmission station 12 and the reception station 16 is a diagonal matrix that has R(m) as a diagonal element. When the inverse response det{H(z, T)}$^{-1}$ is obtained based on R(m), an appropriate reception equalization weight $W_R(z)$ can be obtained.

The above-described sliding can be repeated until an end $s_{TM-1}$ of the M sequence portion S in the lower part of FIG. 6 matches an end $r_{m+TM+Tsuf}$ of the suffix portion Ssuffix in the upper part. In this case, an upper limit of a slide range is Tsuf+1, as illustrated in FIG. 7. When a delay period of the training signal falls within the range of Tsuf+1, the communication path response R(m) in which a state of the multi-paths is correctly reflected can be obtained.

Accordingly, in this case, the appropriate reception equalization weight $W_R(z)$ can be calculated based on the communication path response.

Conversely, when the delay period of the training signal exceeds the slidable range, the multipath element is not reflected in the communication path response R(m) for the portion protruding behind Tsuf+1. In this case, a situation in which the appropriate reception equalization weight $W_R(z)$ cannot be obtained from the communication path response R(m) occurs.

Incidentally, in the present embodiment, the training signal for calculating the reception equalization weight $W_R(z)$ is multiplied by the transmission weight $W_T(z)$. As a result, the signal arriving at the reception station 16 is a signal obtained by multiplying the transmission signal $s_{i,t}$ by det{H(z, t)}, as shown in the foregoing [Math. 4].

Here, when it is assumed that H(z, t) is a 2×2 matrix, det{H(z, t)}=$H_{11}$(z, t)$H_{22}$(z, t)–$H_{12}$(z, t)$H_{21}$(z, t). $H_{11}$(z, t) and $H_{22}$(z, t) in the first term of the right side are communication response paths that have an L-order delay, respectively. Accordingly, when they are multiplied, a result is accompanied by a higher-dimensional delay. The same applies to the second term. For the foregoing reason, when the actual communication path response between the transmission antenna and the reception antenna has a delay wavelength L, det{H(z, t)} has the N(L−1)+1-th order delay, as shown in the following expression.

$$\det\{H(z,t)\}=X_0+X_1z^{-1}+\ldots+X_{N(L-1)+1}z^{-N(L-1)-1}$$

Figure 8:
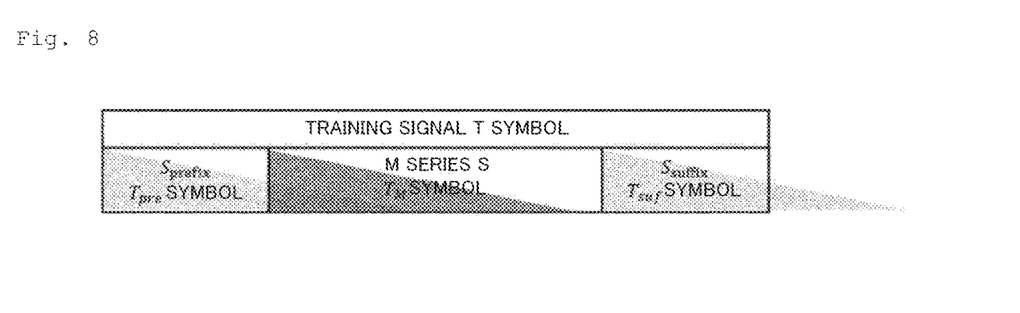
FIG. 8 is a diagram illustrating a state in which an influence of a delay period exceeding an assumption is superimposed on a training signal.

FIG. 8 illustrates an example of a training signal for calculating the reception equalization weight $W_T(z)$ generated as a result of the delay period L in which the environment between the transmission station 12 and the reception station 16 exceeds the initial assumption. In this training signal, for example, an influence of delay of a leading symbol of the M sequence portion S is extended to the vicinity of the end of the M sequence portion S.

Figure 9:
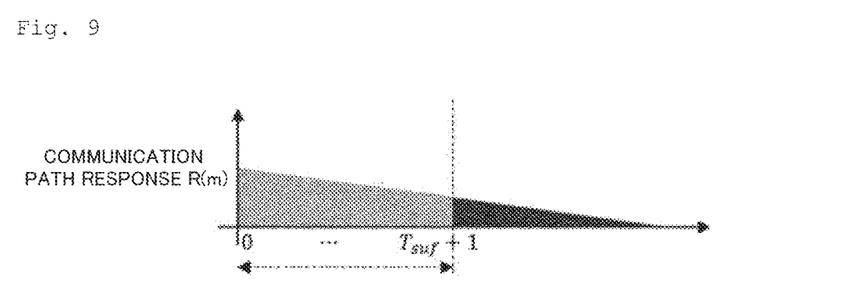
FIG. 9 is a diagram illustrating a situation in which calculation accuracy of the communication path response $R(m)$ deteriorates when the influence of the delay period exceeding the assumption is superimposed on the training signal.

FIG. 9 illustrates a state in which the latter half of the communication path response R(m) protrudes from Tsuf+1 of the slide range. When the training signal indicates a delay as illustrated in FIG. 8, a situation in which the communication path response R(m) does not fall within Tsuf+1, as illustrated in FIG. 9 occurs. Such a situation easily occurs in the training signal for calculating the equalization weight $W_T(z)$ in which an N(L−1)+1-th order delay occurs with respect to the actual delay wavelength L. In this case, since a portion protruding from Tsuf+1 cannot be presumed, an appropriate reception equalization weight $W_T(z)$ cannot be obtained based on the communication path response R(m) obtained by the slide correlation scheme.

Figure 10:
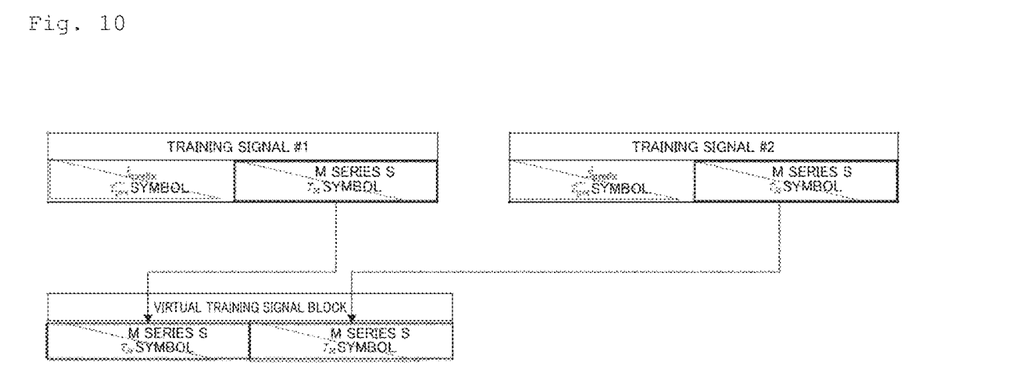
FIG. 10 is a diagram illustrating a characteristic scheme used to calculate the communication path response $R(m)$ according to the first embodiment of the present disclosure.

FIG. 10 is a diagram illustrating a scheme used in the present embodiment to solve the foregoing problem. More specifically, FIG. 10 illustrates an example of the configuration of a training signal for calculating the reception equalization weight $W_R(z)$ used in this embodiment when the communication system 10 is a 2×2 MIMO system.

In FIG. 10, the training signal illustrated on the left side of the upper part indicates training signal #1 exchanged with a first stream formed between a first transmission antenna ATt(1) and a first reception antenna ATr(1). Training signal #1 includes a prefix portion Sprefix including Tpre⌢ symbols (for example, 29 symbols) and an M sequence portion S including a TM symbol. In other words, this training signal does not include the suffix portion Ssuffix of the training signal illustrated in FIG. 6.

In training signal #1 illustrated in FIG. 10, the M sequence portion S includes a $T_M$ symbol (for example, 31 symbols), as in the case of the training signal illustrated in FIG. 6. Specifically, the symbols $s_0$ to $s_{T_{M-1}}$ (for example, $s_0$ to $s_{30}$) are included.

On the other hand, in training signal #1 illustrated in FIG. 10, the prefix Sprefix includes Tpre⌢ symbols (for example, 29 symbols). Tpre⌢ is equal to the number of symbols Tpre+Tsuf included in the prefix portion Sprefix and the suffix portion Ssuffix of the training signal illustrated in FIG. 6. Accordingly, a total number of symbols of training signal of training signal #1 illustrated in FIG. 10 is equal to a total number of symbols of the training signal illustrated in FIG. 6 (for example, 60).

In training signal #1 illustrated in FIG. 10, it is assumed that the prefix Sprefix includes Tpre⌢ symbols belonging to the latter half of $s_0$ to $s_{T_{M-1}}$ (for example, $s_0$ to $s_{30}$) included in the M sequence portion S, that is, $s_{T_{M-1}}$-Tpre⌢ to $s_{T_{M-1}}$ (for example, $s_2$ to $s_{30}$).

In FIG. 10, the training signal illustrated on the right side of the upper part indicates training signal #2 exchanged with the second stream formed between the second transmission antenna ATt(2) and the second reception antenna ATt(2). In this embodiment, as training signal #2, a signal similar to training signal #1 is transmitted and received between the transmission station 12 and the reception station 16.

Here, since the same communication path response is virtually obtained in each of the first and second streams, the reception station 16 receives training signals #1 and #2 as substantially the same signals. In the present embodiment, two training signal #1 and training signal #2 are simultaneously transmitted from the transmission station 12. Therefore, these signals are simultaneously received in the reception station 16.

The lower part of FIG. 10 illustrates a signal obtained by combining the M sequence portions S of two training signals #1 and #2. Hereinafter, this signal is referred to as a "virtual training signal block." In FIG. 10, a triangle drawn on the prefix portion Sprefix and the M sequence portion S in an overlapping manner indicates a state of delay and attenuation appearing on a leading symbol of each section, as in the case illustrated in FIG. 6.

In training signals #1 and #2, the prefix portion Sprefix is easily affected by the delay component of the previous slot. However, in the configuration illustrated in FIG. 10, the suffix portion Ssuffix is eliminated, and a sufficient number of symbols Tpure⌢ =Tpre+Tsuf (for example, 29 symbols) is given for the prefix portion Sprefix. Therefore, even if a delay period L exceeding the assumption is generated and a delay order N(L−1)+1 of training signals #1 and #2 is a large value, the influence is appropriately absorbed by the prefix portion Sprefix and is not spread to the M sequence portion S.

The reception station 16 according to the present embodiment sets the virtual training signal block illustrated in the lower part of FIG. 10 as a slide correlation target and calculates the communication path response R(m). In this case, the calculation of the slide correlation can be repeated until the end of the M sequence portion S for comparison matches the end of the virtual training signal block by setting a state in which the head of the M sequence portion S (corresponding to the M sequence portion S illustrated in the lower part of FIG. 6) for comparison matches the head of the virtual training signal block as a starting point.

That is, in the present embodiment, by using the virtual training signal block illustrated in FIG. 10, it is possible to expand the slide range from Tsuf+1 (for example, 15) to $T_M$+1 (for example, 32) in comparison with the example illustrated in FIG. 6. When the slide range is expanded in this way, the communication path response R(m) can be appropriately calculated even if the delay order N (L−1)+1 of training signals #1 and #2 is a large value.

Further, in the present embodiment, the virtual training signal block is generated by connecting M sequence portions S simultaneously transmitted with a plurality of streams. Therefore, the training signal is not extended compared with the case illustrated in FIG. 6, and a time required to transmit and receive the training signal is not extended. Accordingly, according to the scheme of the present embodiment, it is possible to extend the presumed delay wavelength which can be presumed without causing any deterioration in a transmission capacity.

Referring back to the flowchart illustrated in FIG. 3, the processing of the transmission station 12 and the reception station 16 will be described.

In step 106, as described above, the plurality of training signals are transmitted from the transmission station 12 to the reception station 16 via a plurality of streams indicating the same communication path response. The reception station 16 extracts M sequence portions S from the signals received by the respective streams #1 to #N (step 204), Next, the reception station 16 connects the M sequence portions in series to generate a virtual training signal block (step 206). In the example described with reference to FIG. 10, the two M sequence portions S are connected, but the number of M sequence portions is not limited to two. When a larger slide range is required, three or more M sequence portions S obtained from three or more streams may be connected in step 206.

Subsequently, the virtual training signal block obtained in the step 206 is used as a comparison target, and a communication path response R(m) is calculated in accordance with a slide correlation scheme (step 208).

Further, the reception equalization weight $W_R(z)$ is calculated based on the communication path response R(m) calculated in the above processing (see FIG. 7) (step 210).

Through the foregoing processing, the training processing in the transmission station 12 and the reception station 16 is completed. Thereafter, the transmission station 12 transmits a data signal in which an FIR beam is formed with the transmission weight $W_T(z)$ (step 108). The reception station 16 demodulates the transmission data by equalizing the reception signal with the reception equalization weight $W_R(z)$ (step 212). Thus, communication by an N×N MIMO system is established.

Modification Example of First Embodiment

In the above-described first embodiment, the M sequence is used for the training signal for calculating the reception equalization weight $W_R(z)$, but the present disclosure is not limited thereto. Instead of the M sequence, another sequence generally used for presuming the communication path response may be used.

The above-described first embodiment does not include the processing for notifying the transmission station 12 that the reception station 16 has completed the calculation of the reception equalization weight $W_R(z)$. However, the reception station 16 may notify the transmission station 12 of the completion of the calculation of $W_R(z)$, and the transmission station 12 may start the processing of step 108, that is, transmitting the data signal after waiting for the notification.

Further, in the above-described first embodiment, the case of Tpre⌢ =29 and $T_M$=31 is given as an example. According to the scheme of the present disclosure, for example, a slide range of 32 symbols can be secured by connecting two M sequence portions S in series. The case in which it is necessary to utilize the entire slide range is the case where a delay close to 32 symbols occurs in training signals #1 to N. In such a case, the region in the prefix portion Sprefix affected by the previous slot is also close to 32 symbols. Therefore, in order to improve correlation accuracy when a wide slide range is utilized, the Tpre⌢ is preferably a numerical value matching or close to $T_M$. For example, the value of Tpre⌢ is preferably greater than ½ (for example, 15.5) of $T_M$. Further, the value of the Tpre⌢ is preferably greater than ⅔ (for example, 20.7) of $T_M$ and is preferably greater than ¾ (for example, 23.25) of $T_M$.

In the above-described first embodiment, the transmission station 12 and the reception station 16 are assumed to be base stations for wireless communication, but the present disclosure is not limited thereto. The transmission station 12 and the reception station 16 in the present disclosure may be implemented by a user terminal.

In the above-described first embodiment, the transmission weight $W_T(z)$ is calculated by the transmission station 12, but the present disclosure is not limited thereto. The transmission weight $W_T(z)$ may be calculated by the reception station 16, and the result may be fed back to the transmission station 12 by the reception station 16.

In the above-described first embodiment, the M sequence portion S illustrated in FIG. 10 corresponds to a "correlation sequence portion" described in claim 1, and the M sequence portion illustrated in the lower part of FIG. 6 corresponds to a "comparison sequence portion" described in claim 1. In the above-described first embodiment, the transmission station 12 corresponds to a "wireless communication device" described in claims 5 and 6, and the reception station 16 corresponds to a "wireless communication device" described in claims 7 and 8.

REFERENCE SIGNS LIST

10 Communication system
12 Transmission station
16 Reception station
ATt(1) to ATt(N) Transmission antenna
ATr(1) to ATr(N) Reception antenna
$Hn_r n_t(z, t)$ Communication path response between transmission antenna $ATt(n_t)$ and reception antenna $ATt(n_r)$
H(z, t) Transfer function matrix between transmission station and reception station
adj{H(z, t)} Adjoint matrix of H(z, t)
det{H(z, t)} Determinant of H(z, t)
det{H(z, t)}−1 Inverse response of det{H(z, t)}
$W_T(z)$ Transmission weight
$W_R(z)$ Reception equalization weight
R(m) Communication path response calculated by slide correlation scheme

The invention claimed is:

1. A communication path determining method of determining a communication path between a transmission station and a reception station in a multiple input multiple output (MIMO) system including the transmission station which has a plurality of transmission antennas and the reception station which has a plurality of reception antennas, the method comprising:
a transmission weight calculation for calculating an adjoint matrix adjH(z, t) of a transfer function matrix H(z, t) established between the transmission station and the reception station as a transmission weight $W_T(z)$;
transmitting, from at least two transmission antennas of the plurality of transmission antennas, a training signal which is beamformed by multiplying a transmission signal by the transmission weight $W_T(z)$ along with the transfer function matrix H(z, t) and includes a known symbol group as correlation sequence portions from the transmission station to the reception station;
generating a virtual training signal block by connecting in series the correlation sequence portions included in each of at least two training signals received by at least the two reception antennas of the plurality of reception antennas;
calculating a communication path response R(m) virtually implemented between the transmission station and the reception station utilizing the transmission weight $W_T(z)$ by calculating a correlation between a correlation sequence portion and a comparison sequence portion formed from the same symbol group as the correlation sequence portions at each position while sliding the comparison sequence portion with respect to the virtual training signal block; and
calculating a reception equalization weight $W_R(z)$ corresponding to an inverse response det{H(z, t)}−1 of a determinant det{(H(z, t)} of the transfer function matrix H(z, t) based on the communication path response R(m).

2. The communication path determining method according to claim 1, wherein the training signal includes a prefix portion Sprefix and the correlation sequence portion following the prefix portion Sprefix, and
wherein a number of symbols Tpre of the prefix portion Sprefix is equal to or greater than ½ of a number of symbols $T_M$ of the correlation sequence portion.

3. The communication path determining method according to claim 2, wherein the transmission weight calculation includes:
transmitting, by the transmission station, the training signal for the transmission weight calculation sequentially from each of the plurality of transmission antennas;
determining, by the reception station, a communication path response Hnrnt(z, t) established between each of the plurality of transmission antennas and each of the plurality of reception antennas based on the training signal for the transmission weight calculation received by each of the plurality of reception antennas; and
setting the transfer function matrix H(z, t) based on the communication path response Hnrnt(z, t).

4. The communication path determining method according to claim 2, further comprising:
transmitting, by the transmission station, a data signal beamformed by multiplying by the transmission weight WT(z) toward the reception station after calculating the reception equalization weight WR(z); and
demodulating, by the reception station, the beamformed data signal into transmission data through processing with the reception equalization weight WR(z).

5. The communication path determining method according to claim 1, wherein the transmission weight calculation includes:
transmitting, by the transmission station, the training signal for the transmission weight calculation sequentially from each of the plurality of transmission antennas;
determining, by the reception station, a communication path response $Hn_r n_r(z, t)$ established between each of the plurality of transmission antennas and each of the plurality of reception antennas based on the training signal for the transmission weight calculation received by each of the plurality of reception antennas; and setting the transfer function matrix H(z, t) based on the communication path response $Hn_t n_r(z, t)$.

6. The communication path determining method according to claim 5, further comprising:

transmitting, by the transmission station, a data signal beamformed by multiplying by the transmission weight WT(z) toward the reception station after calculating the reception equalization weight WR(z); and demodulating, by the reception station, the beamformed data signal into transmission data through processing with the reception equalization weight WR(z).

7. The communication path determining method according to claim 1, further comprising:

transmitting, by the transmission station, a data signal beamformed by multiplying by the transmission weight $W_T(z)$ toward the reception station after calculating the reception equalization weight $W_R(z)$; and demodulating, by the reception station, the beamformed data signal into transmission data through processing with the reception equalization weight $W_R(z)$.

8. A wireless communication device that has a plurality of transmission antennas and forms a multiple input multiple output (MIMO) system along with a reception station that has a plurality of reception antennas, the wireless communication device comprising:

transmission beamforming circuitry including a processor and a memory device, wherein the transmission beamforming circuitry is configured to perform:

processing for acquiring an adjoint matrix adjH(z, t) of a transfer function matrix H(z, t) established between the wireless communication device and the reception station as a transmission weight $W_T(z)$;

processing for transmitting, from at least two transmission antennas of the plurality of transmission antennas to the reception station, a training signal that is beamformed by multiplying a transmission signal by the transmission weight $W_T(z)$ along with the transfer function matrix H(z, t) and includes a known symbol group as a correlation sequence portion; and processing for transmitting a data signal beamformed by multiplying by the transmission weight $W_T(z)$ to the reception station after the reception station calculates a reception equalization weight $W_R(z)$ corresponding to an inverse response det{H(z, t)}−1 of a determinant det{H(z, t)} of the transfer function matrix H(z, t).

9. The wireless communication device according to claim 8, wherein the training signal includes a prefix portion Sprefix and the correlation sequence portion following the prefix portion Sprefix, and wherein a number of symbols Tpre of the prefix portion Sprefix is equal to or greater than ½ of a number of symbols $T_M$ of the correlation sequence portion.

10. A wireless communication device that has a plurality of reception antennas and forms a multiple input multiple output (MIMO) system along with a transmission station that has a plurality of transmission antennas, the wireless communication device comprising:

equalization circuitry including a processor and a memory device, wherein the equalization circuitry is configured to perform:

processing for receiving, from at least two reception antennas of the plurality of reception antennas, training signals which are transmitted from at least the two transmission antennas in a state in which the training signals are beamformed utilizing a transmission weight $W_T(z)$ for eliminating interference between streams and include a known symbol group as correlation sequence portions;

processing for generating a virtual training signal block by connecting in series the correlation sequence portions included in at least two training signals;

processing for calculating a communication path response R(m) virtually implemented between the transmission station and the wireless communication device utilizing the transmission weight $W_T(z)$ by calculating a correlation between a correlation sequence portion and a comparison sequence portion formed from the same symbol group as the correlation sequence portions at each position while sliding the comparison sequence portion with respect to the virtual training signal block; and processing for calculating a reception equalization weight $W_R(z)$ for demodulating a transmission signal from a reception signal based on the communication path response R(m).

11. The wireless communication device according to claim 10, wherein the equalization circuitry is configured further to perform:

processing for receiving a data signal beamformed by multiplying by the transmission weight $W_T(z)$ toward a reception station after calculating the reception equalization weight $W_R(z)$ by the transmission station; and processing for demodulating the beamformed data signal into transmission data by processing the data signal with the reception equalization weight $W_R(z)$.

* * * * *